(12) United States Patent
Takano et al.

(10) Patent No.: US 7,953,098 B2
(45) Date of Patent: May 31, 2011

(54) METHOD FOR LIMITING UTILIZING TERMINAL OF CONTENTS, AND STORAGE DEVICE AND SYSTEM FOR METHOD

(75) Inventors: Haruko Takano, Kanagawa (JP); Tatsuya Hirai, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 875 days.

(21) Appl. No.: 11/453,719

(22) Filed: Jun. 14, 2006

(65) Prior Publication Data

US 2006/0282511 A1 Dec. 14, 2006

(30) Foreign Application Priority Data

Jun. 14, 2005 (JP) ................................. 2005-173145

(51) Int. Cl.
*H04L 12/28* (2006.01)
(52) U.S. Cl. ........................................ 370/401; 709/203
(58) Field of Classification Search .................. 709/217, 709/223, 229
See application file for complete search history.

(56) References Cited

U.S. PATENT DOCUMENTS

| | | | | |
|---|---|---|---|---|
| 6,195,696 B1 * | 2/2001 | Baber et al. | .................... | 709/223 |
| 6,282,573 B1 * | 8/2001 | Darago et al. | ................ | 709/229 |
| 6,438,594 B1 * | 8/2002 | Bowman-Amuah | .......... | 709/225 |
| 6,959,288 B1 * | 10/2005 | Medina et al. | .................. | 705/51 |
| 7,219,234 B1 * | 5/2007 | Ashland et al. | ............... | 713/182 |
| 7,451,202 B2 * | 11/2008 | Nakahara et al. | ............. | 709/223 |
| 7,512,812 B2 * | 3/2009 | Sohn | .............................. | 713/189 |
| 2001/0047394 A1 * | 11/2001 | Kloba et al. | .................. | 709/217 |
| 2001/0051996 A1 * | 12/2001 | Cooper et al. | ................ | 709/217 |
| 2002/0073167 A1 * | 6/2002 | Powell et al. | ................. | 709/217 |
| 2002/0169960 A1 * | 11/2002 | Iguchi et al. | .................. | 713/174 |
| 2004/0010687 A1 * | 1/2004 | Futa et al. | ...................... | 713/168 |
| 2004/0162870 A1 * | 8/2004 | Matsuzaki et al. | ............ | 709/200 |
| 2004/0174824 A1 * | 9/2004 | Ohta et al. | ..................... | 370/252 |
| 2004/0230800 A1 * | 11/2004 | Futa et al. | ...................... | 713/169 |
| 2005/0114333 A1 * | 5/2005 | Nagano et al. | ..................... | 707/8 |
| 2008/0091764 A1 * | 4/2008 | Sutardja et al. | ............... | 709/201 |

FOREIGN PATENT DOCUMENTS

| | | |
|---|---|---|
| JP | 2001166996 | 6/2001 |
| WO | WO-2004097606 | 11/2004 |
| WO | WO-2004112311 | 12/2004 |

* cited by examiner

*Primary Examiner* — Phirin Sam

(57) ABSTRACT

The invention flexibly limits a terminal able to play content and prevents unfair utilization of the content. In one embodiment, an identifier proper to each terminal device is allocated to discriminate each playback equipment. The identifier of a terminal which is allowed to play the content is registered to this license. When the content is played, authentication is performed between the terminal device as a license transfer destination and a memory device as a license transfer source. The identifier of the terminal device itself is transmitted to the memory device as a transfer source at an authenticating time. The memory device collates the identifier sent from the terminal device with an identifier registered to the license. If these identifiers are the same identifier, the memory device transfers the license to the terminal device. In contrast to this, if these identifiers are different identifiers, the memory device stops the transfer of the license.

12 Claims, 8 Drawing Sheets

| ITEM | DATA | |
|---|---|---|
| LICENSE IDENTIFIER | | 301 |
| CONTENT IDENTIFIER | | 302 |
| CONTENT KEY | | 102 |
| TERMINAL IDENTIFER LIST | abc | 304 |
| | xyz | |
| | ... | |
| | ... | |
| CONTENT UTILIZATION CONDITION | | 305 |

300 LICENSE

Fig.9

| SIGN | DESIGNATION | EXPLANATION |
|---|---|---|
| KPa | ROUTE PUBLIC KEY | A PUBLIC KEY CORRESPONDING TO A ROOT PRIVATE KEY. THE KEY IS USE TO VERIFY THE CERTIFICATE |
| Kdc | DEVICE CLASS SECRET KEY | KEY DIFFERENT EVERY SPECIFIC UNIT CALLED CLASS |
| KPdc | DEVICE CLASS PUBLIC KEY | PUBLIC KEY CORRESPONDING TO DEVICE CLASS PRIVATE KEY |
| Kd | DEVICE PRIVATE KEY | A KEY EMBEDDED UNIQUERY IN EVERY DEVICE THE KEY IS KEPT INSIDE THE DEVICE SECRETLY |
| KPd | DEVICE PUBLIC KEY | PUBLIC KEY CORRESPONDING TO DEVICE PRIVATE KEY |
| Kch | CHALLENGE KEY | TEMPORARY COMMON KEY GENERATED BY LICENSE TRANSFER SOURCE |
| Ks | SESSION KEY | TEMPORARY COMMON KEY GENERATED BY LICENSE TRANSFER DESTINATION |
| C (Ka, KPdc) | CERTIFICATE | THING FOR PROVING JUST PROPERTY OF KPdc AND HAVING ELECTRONIC SIGNATURE GIVEN BY SECRET KEY Ka MANAGED BY CERTIFICATE AUTHORITY |
| A∥B | DATA CONNECTION | INFORMATION FOR CONNECTING INFORMATION A AND INFORMATION B |
| Lic | LICENSE | SUBSTANCE OF LICENSE |

METHOD FOR LIMITING UTILIZING TERMINAL OF CONTENTS, AND STORAGE DEVICE AND SYSTEM FOR METHOD

CROSS-REFERENCES TO RELATED APPLICATIONS

This application claims priority from Japanese Patent Application No. JP2005-173145, filed Jun. 14, 2005, the entire disclosure of which is incorporated herein by reference.

BACKGROUND OF THE INVENTION

The present invention relates to a method for limiting a utilizing terminal of contents, and a storage device and a system for this method.

As a recent infrastructure is spread, a user can easily utilize digital content of music, a screen image, etc. On the other hand, the digitized content can be comparatively easily altered and copied, and no quality is deteriorated. Therefore, this creates a situation in which an unfair copy is frequently made and copyright is infringed. Various DRM (Digital Rights Management) techniques are proposed to solve such problems.

As an example of the DRM techniques, there are a technique for setting play count of content, a technique for limiting the number of copies, a technique for limiting terminal device which can play the content, etc.

JP-A-2001-351323 (patent literature 1) discloses a method in which the terminal able to utilize the content is limited to only a terminal recording the content. The copyright of the content is protected by adding a limit to circulation of the contents like this. In the setting of "the terminal device which is allowed to play the content is limited" able to play the content by only the device that records the content, a device proper key is applied to an encryption key of the content. In the setting of "there is no restriction of terminal device to play the content," an encryption key of the content is generated using a device ID. The device ID of the terminal device and mode information of the restriction of the terminal device to play the content are stored to a medium recording the contents. In the case of the content of "the terminal device which is allowed to play the content is limited," the content can be decrypted only in the terminal device registering the device proper key. In contrast to this, in the case of "there is no restriction of terminal device to play the content," the device ID is acquired and the content can be decrypted and played with any terminal.

JP-A-2004-264894 (patent literature 2) discloses a method for limiting a terminal able to play content by registering information of a device for allowing regeneration to contents utilization condition information.

Device attributes of the terminal device, e.g., a manufacturer's name, a model number of the terminal device, a function, etc. are stored to each terminal device. On the other hand, device attribute information of the terminal device which is allowed to play the content is registered to the contents utilization condition. When playing the content, it is collated whether the information of the device attributes registered within the terminal device is included in the attribute information of a device registered within the contents utilization condition by a utilization condition interpreting module within the terminal device or not. It is then judged whether the terminal device is allowed to play the content or not.

BRIEF SUMMARY OF THE INVENTION

The method of making the encryption key of the content using temporary key can set only a narrow restriction. This narrow restriction means the terminal which is allowed to play the content is only the terminal used to store the contents. For example, it is impossible to set a flexible limit in which the content can be played in terminals A, B and C, and cannot be played in the other terminals.

Further, in the method for collating the device attributes registered to the terminal and the device attributes registered to the content utilization condition information, the limit of the terminal which is allowed to play the content can be flexibly set, but it is judged whether the terminal are allowed to play the content or not on the terminal side. Therefore, before it is confirmed whether the terminal is suitable for playing the content, the contents utilization condition information is transferred to the terminal. Accordingly, for example, in a system in which a decryption key of the encrypted contents and the contents utilization condition information are delivered and stored together, there is a fear that a malicious third person unfairly will use the content with noncompliant terminal.

A feature of the present invention is to prevent the unfair utilization of the digital content by flexibly limiting the terminal able to play the digital content.

An identifier proper to a terminal is allocated to discriminate each terminal. For example, the identifier is the manufacturer-supplied identifier on nonvolatile memory, etc. within the terminal. For example, the identifier of a terminal that is allowed to play the content is registered to the license. For example, when there are three terminals that is allowed to play the content, each identifier of the three terminals is registered on the license. When the content are utilized by the terminal, authentication is performed between the terminal of a license output destination and a storage device recording the license. At an authenticating time, the identifier of the terminal itself is transmitted to the storage device. The storage device collates the sent identifier and an identifier list within the license. For example, the license is outputted when a conformed identifier exists in the list of identifier in the license. In contrast to this, when no conformed identifier exists in the list of identifier in the license, the output of the license is stopped.

Further, in consideration of convenient property of a user, a space area able to register the identifier to the identifier list by the user is arranged when the user registers the identifier of a personal possessing terminal to the identifier list within the license. When no identifier of the user terminal itself acquired by the storage device exists within the list of identifier in the license recorded in storage device at an authenticating time between the storage devices recording the content and its associated license and the terminal, the storage device examines whether the space area exists in the identifier list. When the space area exists, the storage device registers the identifier of the user terminal to this space area. In contrast to this, when no space area exists, the user sends the identifier of a terminal desirous to be deleted to the storage device together with the identifier of the user terminal. The storage device deletes the acquired identifier to be deleted from the identifier list.

When the terminal having authority for deleting the identifier of the identifier list is limited to a specific terminal, the identifier is registered to an identifier registering area in, e.g., a time series order. Deletion processing authority of the identifier is given to a terminal possessing the identifier (e.g., an identifier registered to an uppermost byte of the identifier registering area) registered to a specific area of the identifier list.

A service provider concerned for providing the content can arbitrarily determine an individual of the terminal able to utilize the content, and the number of terminals by applying the present invention.

Further, when the registering area of the identifier is arranged, the user can also arbitrarily determine the terminal able to utilize the content.

There is no fear that the license is outputted to an unfair terminal since it is judged whether the content can be utilized in the terminal of an output destination within the storage device which stored the license or not.

BRIEF DESCRIPTION OF THE DRAWINGS

FIG. 9 is a diagram showing explanations of related key and certificate.

DETAILED DESCRIPTION OF THE INVENTION

Specific embodiments of the present invention will next be explained by using the drawings.

Embodiment 1

Figure 1:
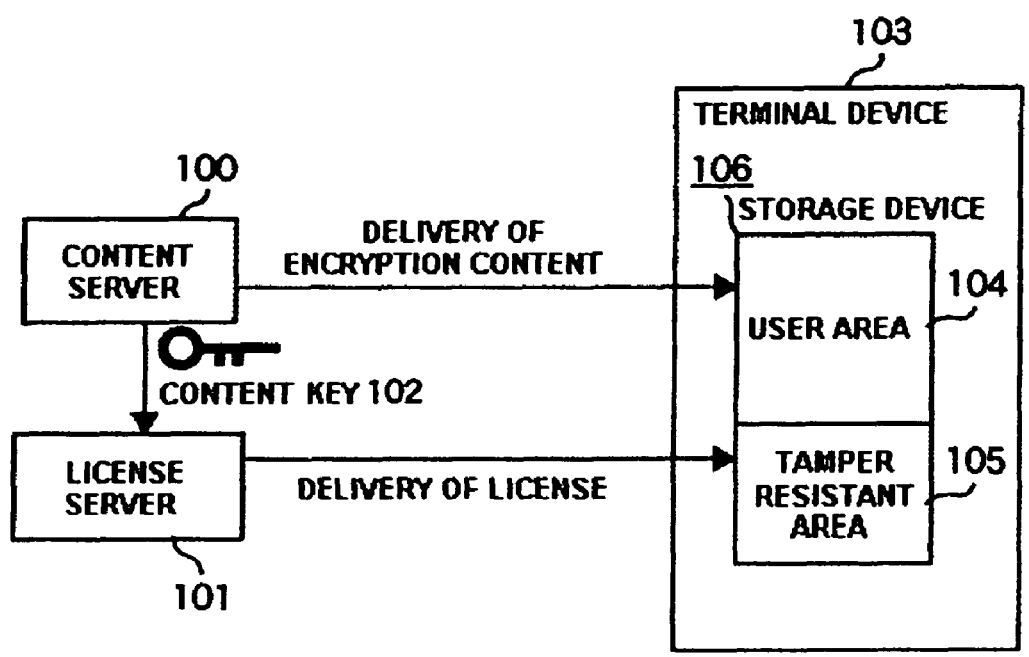
FIG. 1 is a diagram showing the construction of a content delivery system.

An embodiment of a case for applying the present invention to a content delivery system will be schematically described by using FIG. 1. Reference numeral 100 designates a content server for delivering encryption content. The content is delivered after encryption using symmetric key cryptography. A key used in encrypting the content is called a contents key 102. The content key 102 is also used to decrypt the encryption content, and is included in a license delivered by a license server 101. The license includes the content key 102, a utilization condition of the content, etc. A data format of the license will be described later. Reference numeral 103 designates a terminal device utilizing the content. The terminal device 103 can be connected to a storage device 106 of a built-in or portable type, or can communicate with this storage device 106. The storage device 106 has a user area 104 freely accessed by a user, and a tamper resistant area 105 having a limit in the access.

The terminal device 103 records the encryption content acquired from the content server 100 to the user area 104 of the storage device 106.

Further, the terminal device 103 records the license acquired from the license server 101 to the tamper resistant area 105 of the storage device 106.

The terminal device 103 decrypts the encryption content recorded to the user area of the storage device 106 with the content key 102 included in the license recorded to the tamper resistant area 105 at content utilizing time. For example, the terminal device 103 is a device able to utilize the content such as a personal computer (PC), PDA, a portable telephone, a portable terminal, STB, a car navigation system, etc.

Figure 2:
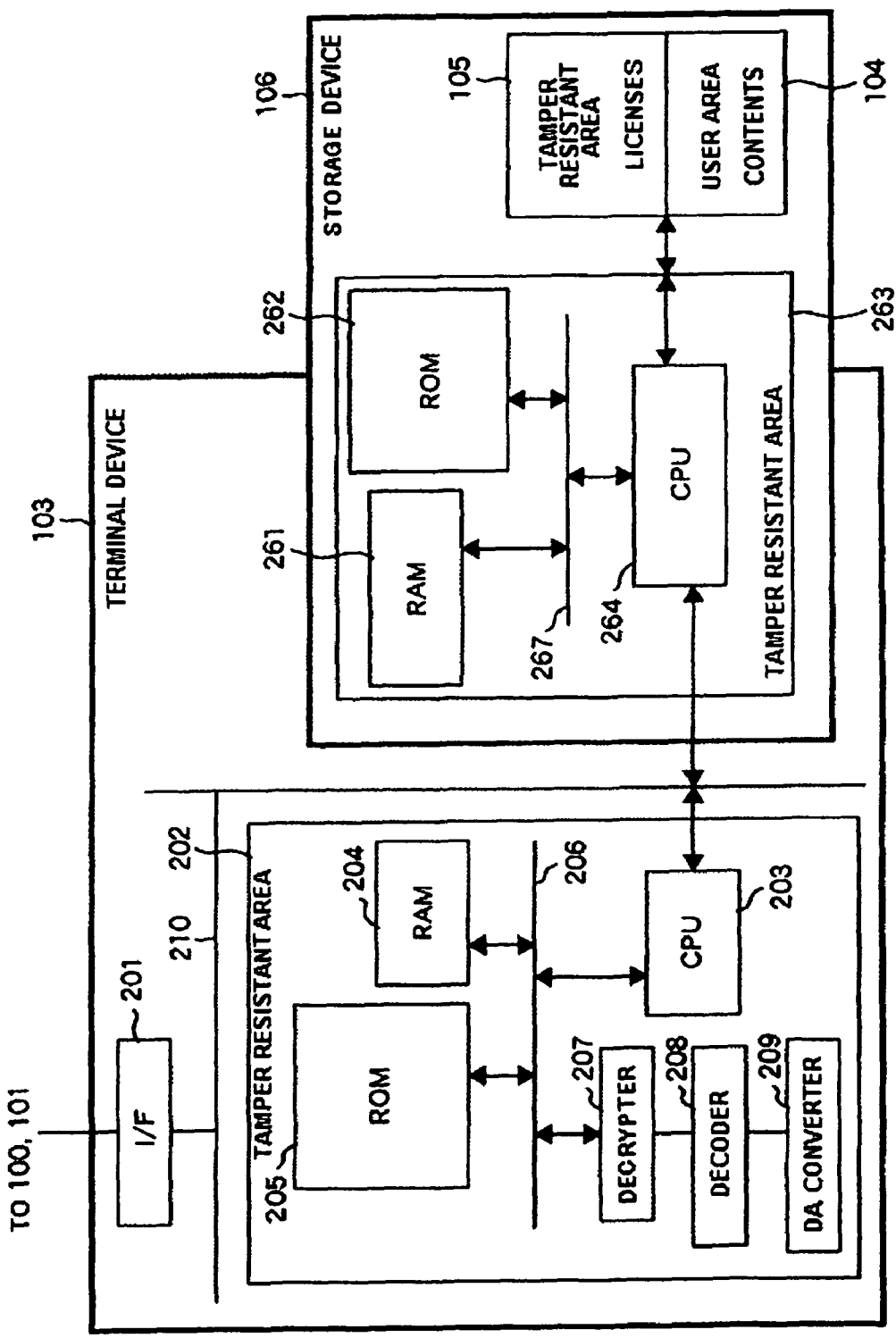
FIG. 2 is a diagram showing a hardware construction example of a terminal device and a storage device.

The hardware construction of the terminal device 103 and the storage device 106 will next be explained by using FIG. 2. A case for utilizing the content by connecting the storage device 106 of a portable type recording the encryption content and the license to the terminal device 103 will be explained.

The terminal device 103 has an interface 201 and a tamper resistant area 202 as its one portion. The tamper resistant area 202 includes a ROM 205, a RAM 204, a CPU 203, a decrypter 207, a decoder 208 and a DA converter 209.

The CPU 203 functions as a control mechanism for executing an OS and various kinds of programs in accordance with programs stored to the ROM 205. Concrete processing is encryption and decryption of data under algorithms of a symmetric-key cryptography and a public-key cryptography, generation of a session key, interpretation of utilization condition within the license, a judgment as to whether the content can be utilized or not, etc. For example, the session key is generated on the basis of a pseudo random number, a random number obtained from thermal noises, etc.

Fixing data among programs and parameters for an arithmetic calculation used by the CPU 203 are recorded to the ROM 205 in advance. Further, a certificate showing just property of a device class public key of a terminal, a device class public key KPdc, a device class private key Kdc, a device public key KPd, a device private key Kd, a terminal identifier, etc. are registered. For example, the certificate is based on X.509 of an ITU (International Telecommunication Union) report. FIG. 9 shows an explanation of related key and certificate.

A terminal identifier is an identifier proper to each terminal, and is made from, e.g., a serial number, a manufacture date, etc. The identifier is differently allocated to every terminal even in the terminal of the same model number. For example, the terminal identifier is recorded to the ROM 205, etc. of the terminal device 103 at a manufacturing time. The RAM 204 stores a program executed by the CPU 203, a parameter suitably changed during its execution, encrypted data and decrypted data intermediately calculated and waiting for processing, etc.

The CPU 203, the ROM 205, the RAM 204 and the decoding device 207 are connected to each other through a bus 206. All of the CPU 203, the ROM 205, the RAM 204, the decrypter 207, the decoder 208, the DA converter 209 and the bus 206 connecting these devices are located in the same tamper resistant area 202. For example, the tamper resistant area is realized as a structure in which an area desirous to set a tamper resistant is sealed by resin and a circuit is also broken when it is intended to remove the resin.

The interface 201 functions as a communication control mechanism when the terminal device 103 communicates with the contents server 100 and the license server 101.

The terminal device 103 generally includes a CPU, a memory, a storage device, an input-output device, etc. in addition to the interface 201 and the tamper resistant area 202. However, these included devices do not directly relate to the present invention, and their illustrations and explanations are therefore omitted.

The construction of the storage device 106 of the portable type for recording the content and the license will next be explained. For example, the storage device 106 of the portable type is a magnetic disk device.

The storage device 106 includes a ROM 262, a RAM 261, a CPU 264, and the tamper resistant area 105 and the user area 104 of a magnetic disk.

The CPU 264 functions as a control mechanism for executing various kinds of programs in accordance with programs stored to the ROM 262. Concrete processing is encryption and decryption of data using algorithms of a symmetric key cryptography and a public key cryptography, a hash calculation, generation of a challenge key, verification of a certificate, collation of a terminal identifier, a judgment as to whether the license can be transferred or not, etc. For example, the challenge key is generated on the basis of a pseudo random number, a random number obtained from thermal noises, etc.

Fixing data among programs and parameters for an arithmetic calculation used by the CPU 264, a public key KPa required at a verifying time of the certificate, etc. are recorded to the ROM 262.

A program executed in the CPU 264, a parameter suitably changed during its execution, encrypted data and decrypted data intermediately calculated and waiting for processing, etc. are stored to the RAM 261.

The CPU 264, the ROM 262, the RAM 261 and a bus 267 connecting these devices are located in a tamper resistant area 263 included in the storage device 106. A realizing method of the tamper resistant area is constructed as mentioned above.

The magnetic disk included in the storage device 106 includes the user area 104 able to freely get access to data by a user, and the tamper resistant area 105 having a limit in the access to data. Encryption content is stored to the user area 104. A license is stored to the tamper resistant area 105. The magnetic disk is connected to the CPU 264 through an unillustrated magnetic head, a read-write channel, etc.

The interface 201 of the terminal device 103 receives the content and the license sent from the content server 100 and the license server 101, and sends the content and the license to the storage device 106 through a bus 210. The CPU 264 of the storage device 106 receives and respectively stores these content and license to the user area 104 and the tamper resistant area 105.

Both the terminal device 103 and the storage device 106 may also wirelessly communicate with each other without physically connecting the terminal device 103 to the storage device 106.

Figures 3, 4:
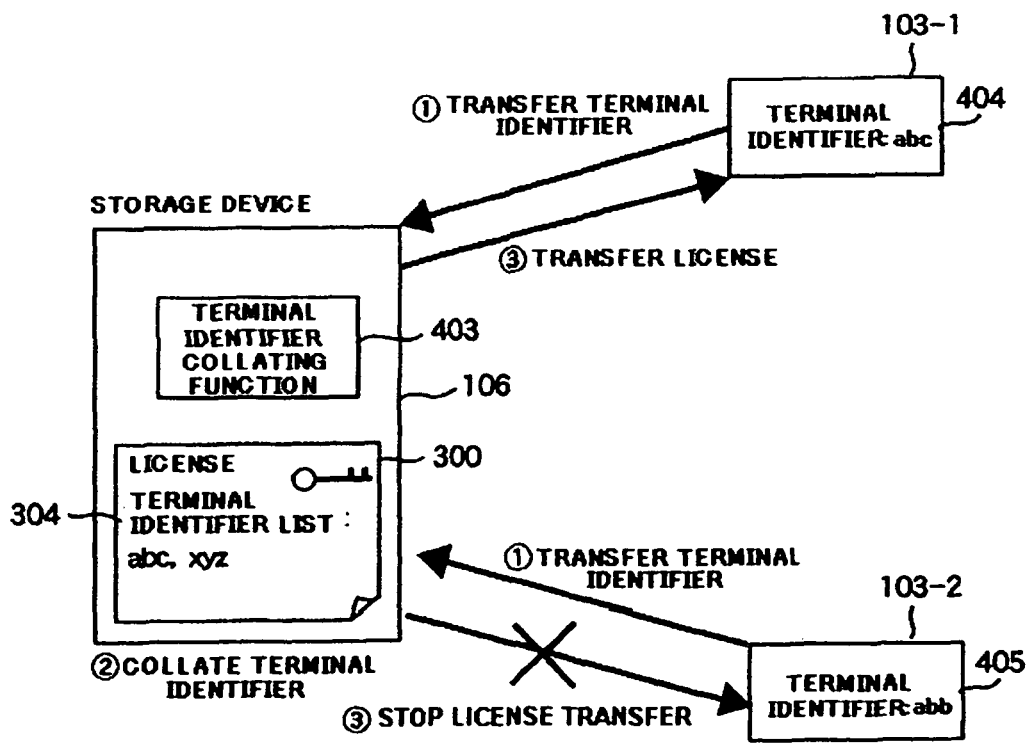
FIG. 3 is a diagram showing a data format example of a license.
FIG. 4 is a diagram for explaining a schematic operation when the license is sent from the storage device to the terminal device.

A data format of the license will be explained by using FIG. 3. As shown in FIG. 3, the license includes a license identifier 301, a content identifier 302, the content key 102 for decryption of the encryption content, a terminal identifier list 304 and a content utilization condition 305. Identifiers of terminals which is allowed to play the content are registered in the terminal identifier list 304 of this license. For example, the content utilization condition 305 includes the number of times of playback of the content, etc.

A processing procedure in transferring the license from the storage device 106 to the terminal device 103 will next be schematically explained by using FIG. 4. Here, the explanation is made when the license 300 is read out of the storage device 106 and is outputted to the terminal device 103.

First, the storage device 106 registering the license 300 is connected to the terminal device 103. Thus, the storage device 106 authenticates the terminal device 103 by a mechanism described later.

A terminal device 103-1 sends a self terminal identifier 404($abc$) to the storage device 106 in the authentication. The storage device 106 collates a terminal identifier list 304($abc$, $xyz$) within the license 300, and the sent terminal identifier 404($abc$). The terminal identifier of the terminal device 103-1 exists in the terminal identifier list 304 of the license 300. Therefore, the storage device 106 outputs the license 300 to the terminal device 103-1.

A terminal device 103-2 sends a self terminal identifier 405($abb$) to the memory device 106 in the authentication. The storage device 106 collates the terminal identifier list 304 ($abc$, $xyz$) of the license 300, and the sent terminal identifier 405($abb$). Since no terminal identifier ($abb$) of the terminal device 103-2 exists in the terminal identifier list 304 within the license 300, the storage device 106 stops the output of the license 300 to the terminal device 103-2.

Figure 5:
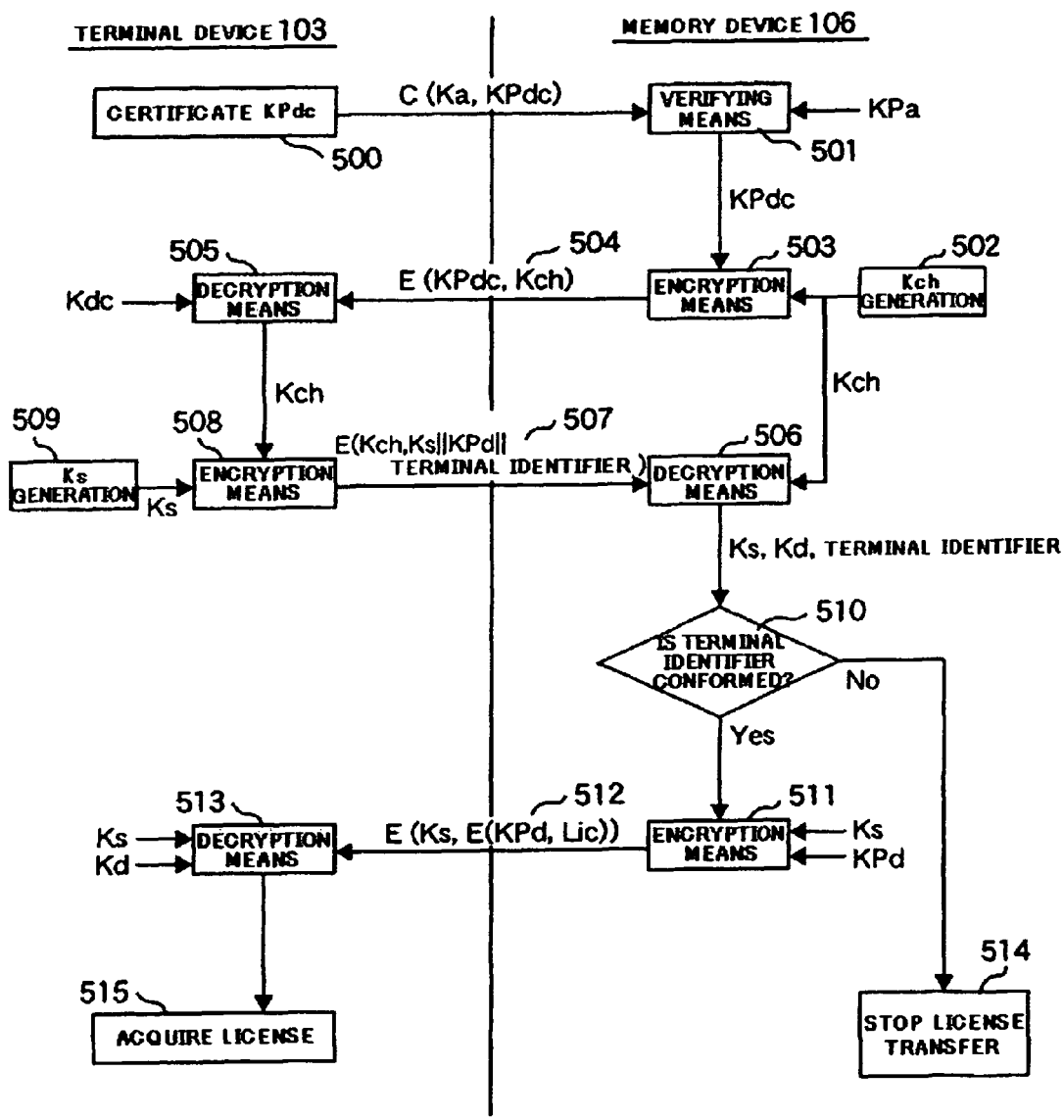
FIG. 5 is a diagram for explaining a processing procedure at a license transferring time in embodiment 1 of the invention.

A series of processing procedures executed in moving or copying the license 300 registered to the tamper resistant area 105 of the storage device 106 to the terminal device 103 will next be explained by using FIG. 5. The explanations of keys and signs used in FIG. 5 are summarized in FIG. 9.

First, the terminal device 103 as a license transfer destination transmits a certificate 500 to the storage device 106 as a license transfer source to prove that the terminal device 103 itself is a just transfer destination. The storage device 106 verifies the certificate 500 of a transfer destination terminal as its external device (501). When the storage device 106 as a license transfer source judges that the terminal device 103 is a device suitable to transfer the license after the verification of the certificate, the storage device 106 generates a challenge key Kch (502). The challenge key Kch is encrypted by a device class public key KPdc of a transfer destination annexed to the certificate using public key cryptography (503). The encrypted challenge key Kch is transmitted to the terminal device 103 (504). The terminal device 103 decrypts the sent encrypted challenge key with a device class private key Kdc, and acquires the challenge key Kch (505). Next, the terminal device 103 makes a session key Ks (509). A device public key KPd and a terminal identifier recorded to the terminal in advance are connected to the made session key, and are encrypted with the challenge key Kch sent from the storage device 106 in the process of 504 (508) using a symmetric key cryptography.

The encrypted session key Ks, the device public key KPd and the terminal identifier are transmitted to the storage device 106 as a license transfer source (507). The storage device 106 as a license transfer source decrypts the sent encrypted data with the challenge key Kch (506), and the session key Ks, the device public key KPd and the terminal identifier are acquired. The storage device 106 collates whether the acquired terminal identifier is conformed to one of terminal identifiers of the terminal identifier list 304 included in the license 300 (510). When the acquired terminal identifier is not conformed to one of the terminal identifiers of the terminal identifier list 304, the storage device 106 stops output processing of the license on the spot (514). In contrast to this, when the acquired terminal identifier is conformed to one of the terminal identifiers of the terminal identifier list 304, the license 300(Lic) is encrypted with the device public key KPd and the session key Ks sent from the terminal device 103 in the process of 507 (511), and is outputted to the terminal device 103 (512). The terminal device 103 decrypts the received encrypted data with the session key Ks made in the process of 509 and the device private key Kd registered to the terminal in advance (513), and acquires the license 300 (515).

After the license is acquired, the terminal device 103 confirms a contents utilization condition 305 of the license. When this condition is satisfied, the terminal device 103 extracts the contents key 102 from the license 300, and decrypts the encrypted content.

Embodiment 2

A system able to personally register the identifier of a terminal for allowing the utilization of content to the license 300 by a user will next be explained as embodiment 2. A space area is arranged in the terminal identifier list of the license 300. The identifier of the terminal possessed by the user is personally registered to this space area by the user. For example, when the number of terminals which is allowed to play the content is limited until five terminals by a content provider, there is need to prepare free space to register five terminal identifiers. In this embodiment, the space area able to register the terminal identifier is called an identifier registering area. The number of registrations of the identifiers can be limited by changing the size of the identifier registering area.

A procedure for registering the terminal identifier to the identifier registering area of the license 300 by a user will next be explained by using FIG. 6. First, the storage device 106 recording content is connected to a certain terminal device 103. Thus, authentication is performed by the above-mentioned method between the terminal device 103 and the storage device 106, and the storage device 106 acquires an identifier of the terminal itself from the terminal device 103 (600). The storage device 106 collates the identifier acquired from the terminal and the terminal identifier list 304 recorded to the license 300 (601). When the same terminal identifier exists in the terminal identifier list 304, license transfer processing is advanced (604). In contrast to this, when there is no registration of this terminal identifier, the storage device 106 judges whether there is a space area able to additionally register a new identifier in the identifier registering area of the license 300 or not (602). When there is no space in the identifier registering area, the transfer processing of the license is stopped (605). In contrast to this, when a space area exists in the identifier registering area, the storage device 106 records this terminal identifier to the identifier registering area of the license 300 (603), and executes the license transfer processing (604).

Next, for example, an explanation will be made with respect to a case in which a terminal possessing the registered terminal identifier is broken in a state where area for identifier registration is already full so that the identifier of the broken terminal is deleted and the identifier of another terminal is newly registered.

Figure 7:
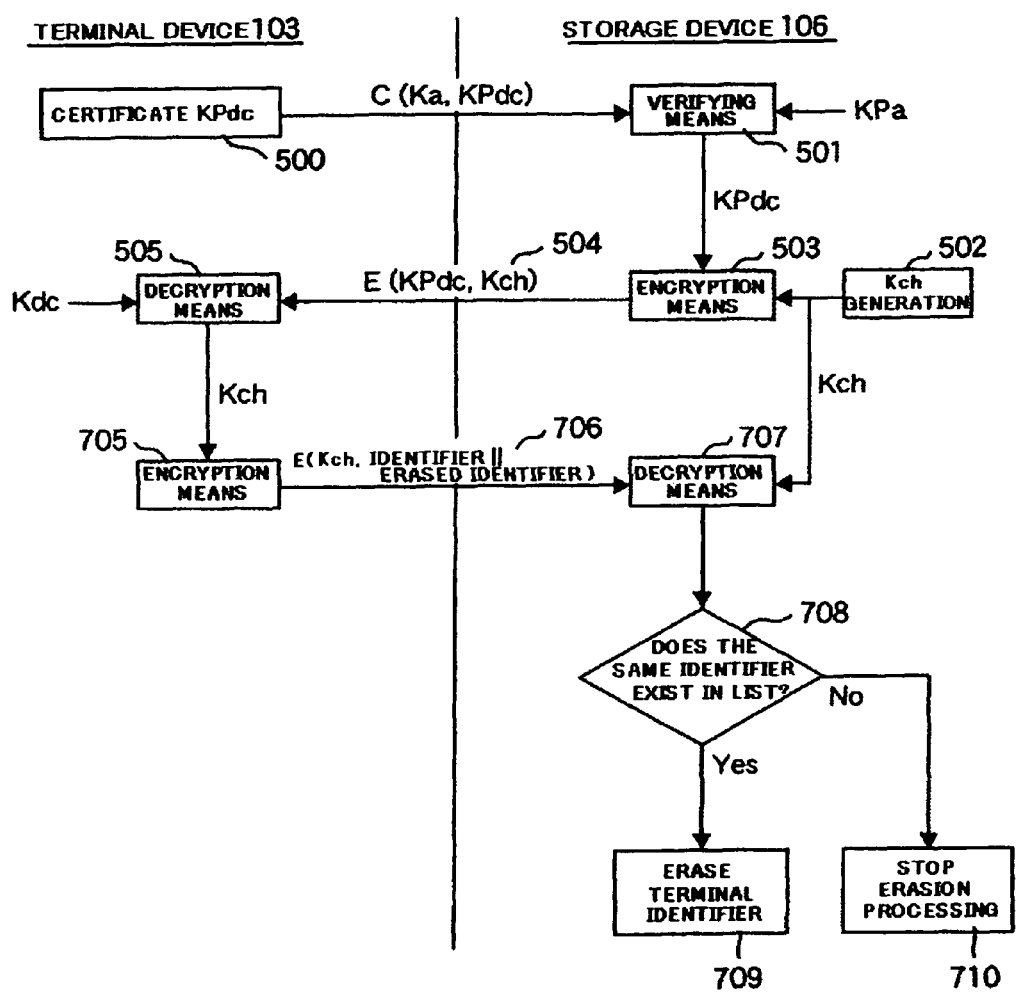
FIG. 7 is a diagram for explaining giving and taking and processing of data performed between the terminal and the storage device to perform deletion processing of an unnecessary identifier in embodiment 2 of the invention.

A procedure for deleting the terminal identifier will be explained by using FIG. 7. When the storage device 106 is first connected to the terminal device 103, the terminal device 103 outputs a personal certificate 500 to the storage device 106. The storage device 106 verifies the received certificate 500 (501). When the storage device 106 judges that the terminal device 103 is a terminal suitable to output data by the verification of the certificate, the storage device 106 generates a challenge key Kch (502). The storage device 106 encrypts the made challenge key Kch with a device class private key KPdc sent together with the certificate (503) using public key cryptosystem, and transmits this encrypted challenge key Kch to the terminal (504). The terminal device 103 decrypts the received encrypted data with a device class private key Kdc, and acquires the challenge key Kch (505). The terminal device 103 encrypts the identifier to be deleted and the self identifier with the challenge key Kch sent in the process of 504 (705), and outputs these encrypted identifiers to the storage device 106 (706).

The storage device 106 decrypts the received encrypted data with the challenge key Kch (707), and acquires the identifier to be deleted and the identifier of the connected terminal. The storage device 106 compares the terminal identifier list 304 located within the license with the sent terminal identifier, and confirms whether the identifier of the connected terminal exists in the terminal identifier list or not (708).

When no identifier of the terminal being connected exists in the terminal identifier list, the storage device 106 stops erasion processing of the identifier (710). In contrast to this, when the identifier of the terminal being connected exists in the terminal identifier list, the storage device 106 finds the identifier to be deleted from the identifier list, and performs the erasion processing (709). The identifier to be erased must be included in the terminal identifier list.

Figure 6:
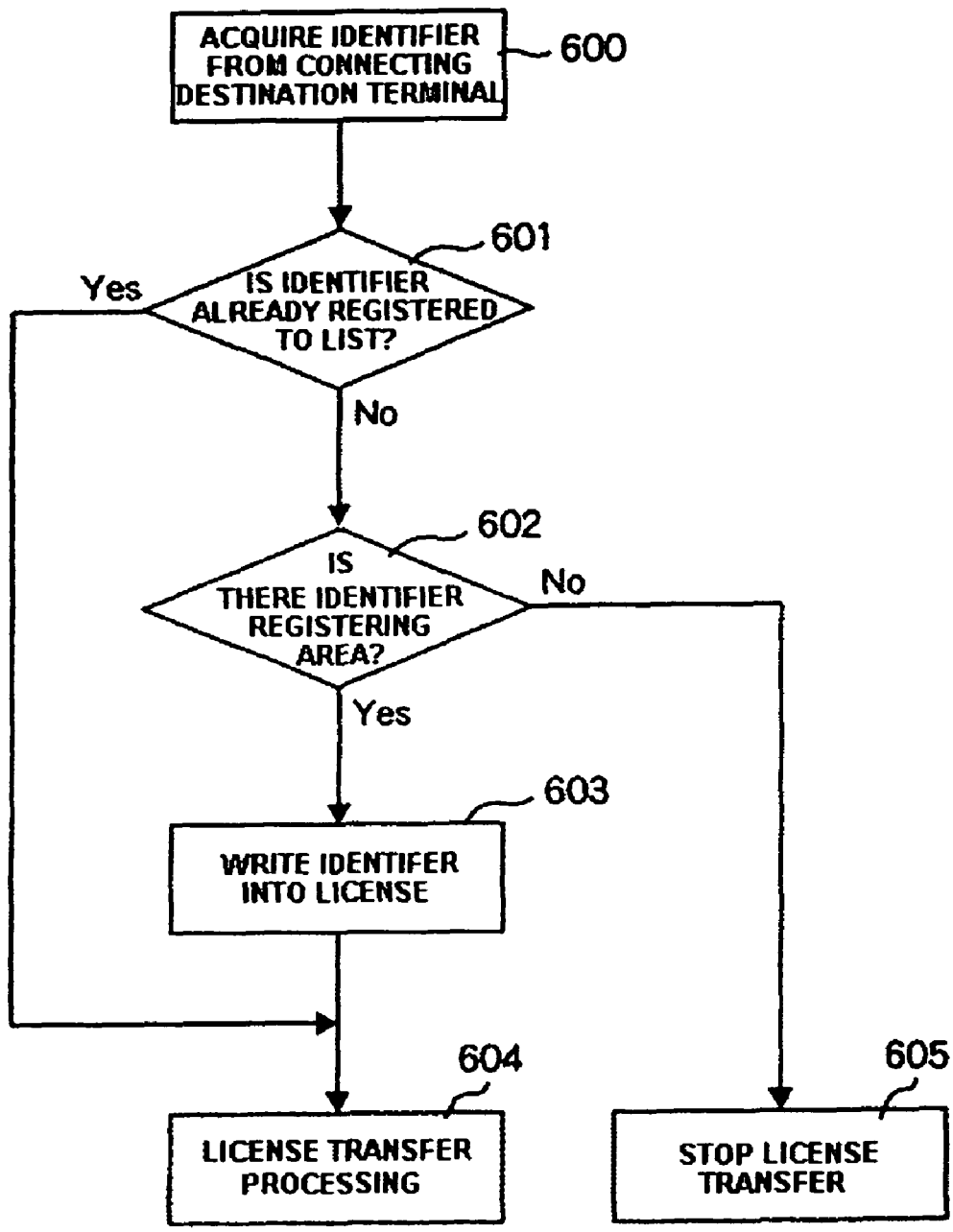
FIG. 6 is a diagram for explaining a procedure for registering an identifier to an identifier registering area within the license in embodiment 2 of the invention.

When the terminal identifier is erased, an identifier registering area within the license 300 is made, and a new terminal identifier can be registered to the license 300 by processing shown in FIG. 6, and a new terminal device 103 can utilize content.

Next, an explanation will be made with respect to a case in which the terminal device 103 having authority able to erase the terminal identifier is limited to a terminal device 103 possessing an identifier registered to a predetermined specific area of the terminal identifier list. Here, the terminal device 103 possessing the identifier registered to the specific area of the terminal identifier list is called a master terminal. For example, the terminal device 103 registering the terminal identifier to the identifier registering area in a time series order, and possessing a terminal identifier (a terminal identifier registered to an uppermost byte of the identifier registering area) registered for the first time is set to the master terminal and given the authority of deletion of terminal identifiers.

Figure 8:
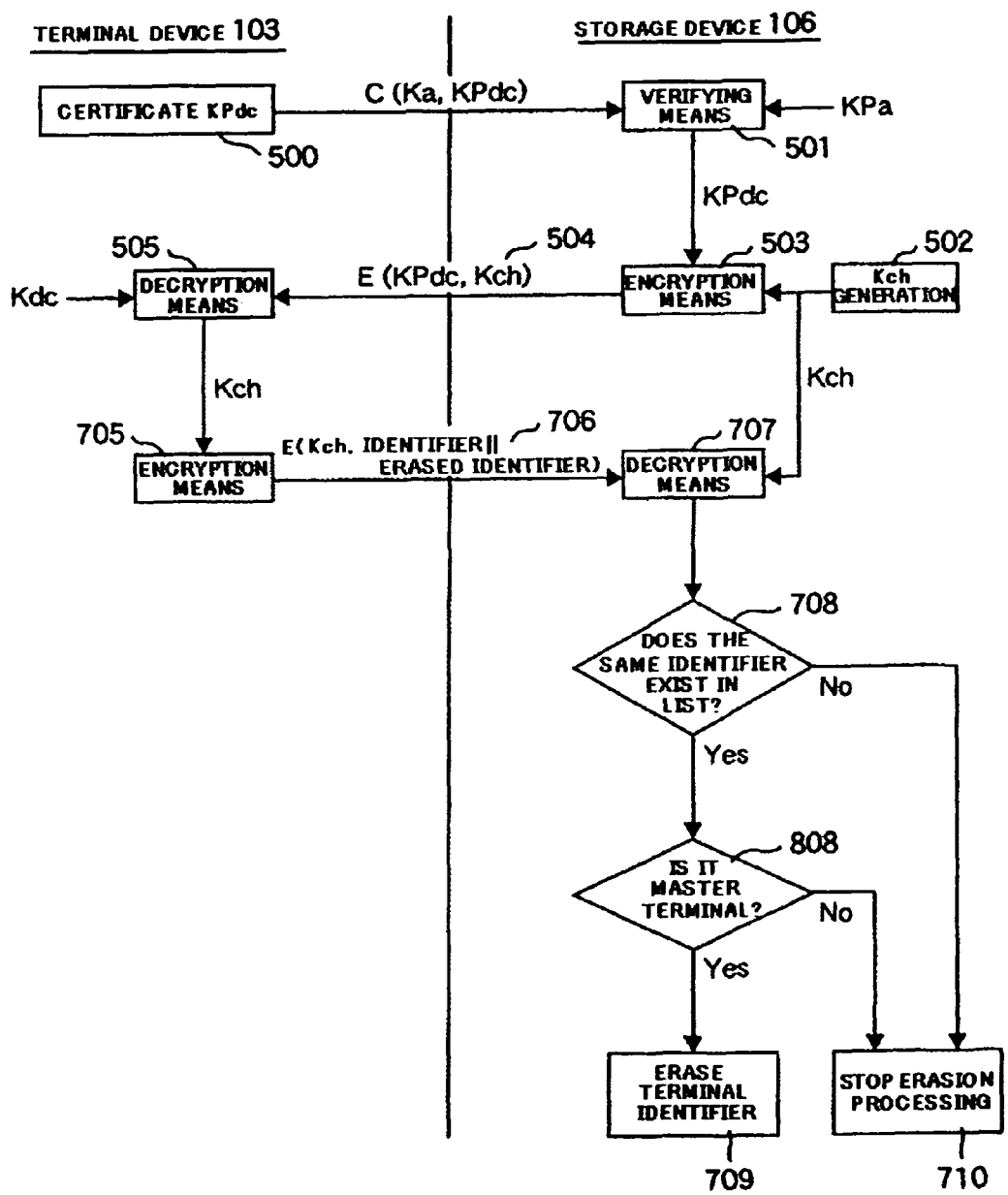
FIG. 8 is a diagram for explaining giving and taking and processing of data performed between the terminal and the storage device in deleting the unnecessary identifier by a master terminal in embodiment 2 of the invention.

The procedure of a case for erasing the terminal identifier by the master terminal will be explained by using FIG. 8. When the storage device 106 is first connected to the terminal device 103, the terminal device 103 outputs a self certificate 500 to the storage device 106. The storage device 106 verifies the received certificate 500 (501). When the storage device 106 judges that the terminal device 103 is a terminal suitable to output data after the verification of the certificate, the storage device 106 generates a challenge key Kch (502). The storage device 106 then encrypts the made challenge key Kch with the device class public key KPdc sent together with the certificate from the terminal device (503) using public key cryptosystem, and transmits the encrypted challenge key Kch to a terminal (504). The terminal device 103 decrypts the sent encrypted data with the device class private key Kdc, and acquires the challenge key Kch (505). The terminal device 103 encrypts the terminal identifier to be deleted and a self identifier with the challenge key Kch sent in the process of 504 using the symmetric key cryptography (705), and outputs these identifiers to the storage device 106 (706).

The storage device 106 decrypts the received encrypted data with the challenge key Kch (707), and acquires the identifier to be deleted and the identifier of the connected terminal. The storage device 106 then judges whether the sent terminal identifier of the terminal device 103 exists in the list of terminal identifiers 304 located within the license or not (708). When the sent terminal identifier exists in the terminal identifier list 304, the storage device 106 confirms whether or not this identifier is registered to a predetermined specific area, or this identifier is the identifier of a user having authority for performing deletion, It is then judged whether the terminal device 103 being connected is a master terminal or not (808).

If the same identifier as the identifier sent from the terminal device 103 does not exist in the list or although the sent identifier exist in the list, the identifier is not the identifier of the master terminal, the erasion processing of this identifier is stopped (710). In contrast to this, if the same identifier as the identifier sent from the terminal device 103 is the identifier of the master terminal, the identifier to be deleted is found from the terminal identifier list 304 and the erasion processing of the identifier to be deleted is performed (709).

When the terminal identifier is erased, an identifier registering area within the license 300 is made and a new terminal identifier can be registered to the license 300 by processing shown in FIG. 6, and a new terminal device 103 can utilize the content.

When the master terminal is broken, it is impossible to execute the above processing. Therefore, for example, plural terminal devices 103 as the master terminal may be also set.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A storage device able to communicate with an external device, said storage device comprising:
    a memory area for storing identifiers in an identifier list for allowing utilization of contents of said external device;
    means for receiving an identifier belonging to a certain external device from said external device said external device comprising:
        a user accessible area for recording an encryption content acquired from said storage device; and
        a tamper resistant area for recording a license acquired from said storage device, said tamper resistant area comprising a structure sealed by resin such that a circuit is broken if the resin is removed therefrom;
    means for judging whether said received identifier is included in said identifier list or not;
    means for starting an operation for allowing utilization of contents to said external device when said identifier is included in said identifier list;
    means for determining whether a registering space is available in said memory area of said identifier list;
    in an event that said registering space is available in said memory area, said storage device registers said identifier to said memory area of said identifier list when no identifier is included in said identifier list;
    in an event that said registering space is not available in said memory area, said storage device stops said operation; and
    wherein said storage device is a magnetic disk drive, said magnetic disk drive comprising:
        a magnetic head;
        a magnetic disk; and
        a read-write channel.

2. The storage device according to claim 1, wherein a contents key for decoding encrypted contents is further stored to said memory area, and said operation for allowing utilization of said contents is an operation for reading-out said contents key and transmitting said contents key to said external device.

3. The storage device according to claim 1, wherein said receiving means receives said identifier and a second identifier to be deleted, and said storage device further comprises means for deleting said second identifier from said identifier list and being able to add a new identifier to said identifier list when said identifier and said second identifier are included in said identifier list.

4. The storage device according to claim 3, wherein said means for deleting said second identifier from said identifier list further sets matter that said identifier is an identifier of said external device having deleting authority to a condition of a deletion.

5. A method for limiting a terminal device utilizing contents by a storage device, said method comprising:
    receiving an identifier belonging to said terminal device and transmitted by said terminal device said terminal device comprising:
        a user accessible area for recording an encryption content acquired from said storage device; and
        a tamper resistant area for recording a license acquired from said storage device, said tamper resistant area comprising a structure sealed by resin such that a circuit is broken if the resin is removed therefrom;
    judging whether said received identifier is included in an identifier list of said terminal device stored to a memory area or not;
    in an event that said identifier is included in said identifier list, said terminal device starts processing for utilizing contents;
    in an event that said identifier is not included in said identifier list, determining whether said memory area of said identifier list has an available registering space;
    in an event that said registering space is available, said storage device additionally registers said identifier to said registering space of said identifier list; and
    in an event that said registering space is not available, said storage device stops processing for utilizing said contents; and
    wherein said storage device is a magnetic disk drive, said magnetic disk drive comprising:
        a magnetic head;
        a magnetic disk; and
        a read-write channel.

6. The method according to claim 5, further comprising:
    storing a contents key for decoding encrypted contents to said memory area,
    wherein processing for utilizing said contents is a processing for reading-out said contents key and transmitting said contents key to said terminal device.

7. The method according to claim 5, further comprising:
    receiving said identifier and a second identifier to be deleted; and
    deleting said second identifier from said identifier list and adding a new identifier to said identifier list when said identifier and said second identifier are included in said identifier list.

8. The method for according to claim 7, further comprising:
    setting matter that said identifier is an identifier of said external device having deleting authority to a condition of a deletion.

9. A storage device able to communicate with an external device, said storage device comprising:
    a memory area for storing identifiers in an identifier list for allowing utilization of contents of said external device;
    a receiving module configured to receive an identifier belonging to a certain external device from said external device said external device comprising:

a user accessible area for recording an encryption content acquired from said storage device; and a tamper resistant area for recording a license acquired from said storage device, said tamper resistant area comprising a structure sealed by resin such that a circuit is broken if the resin is removed therefrom;

a judging module configured to judge whether said received identifier is included in said identifier list or not;

a starting module configured to start an operation for allowing utilization of contents to said external device when said identifier is included in said identifier list;

a space determining module configured to determine whether a registering space is available for accepting a new identifier;

a registering module configured to register additionally said identifier to said identifier list when no identifier is included in said identifier list and said new identifier can be added to said identifier list; and wherein said storage device is a magnetic disk drive, said magnetic disk drive comprising:

a magnetic head;
a magnetic disk; and
a read-write channel.

10. The storage device according to claim 9, wherein a contents key for decoding encrypted contents is further stored to said memory area, and said operation for allowing utilization of said contents is an operation for reading-out said contents key and transmitting said contents key to said external device.

11. The storage device according to claim 9, wherein said receiving module receives said identifier and a second identifier to be deleted, and said storage device further comprises a deleting module configured to delete said second identifier from said identifier list and being able to add a new identifier to said identifier list when said identifier and said second identifier are included in said identifier list.

12. The storage device according to claim 11, wherein said deleting module further sets matter that said identifier is an identifier of said external device having deleting authority to a condition of a deletion.

* * * * *